United States Patent
Booth et al.

(10) Patent No.: US 9,553,582 B1
(45) Date of Patent: Jan. 24, 2017

(54) PHYSICAL UNCLONABLE FUNCTIONS HAVING MAGNETIC AND NON-MAGNETIC PARTICLES

(71) Applicant: Lexmark International, Inc., Lexington, KY (US)

(72) Inventors: James Ronald Booth, Nicholasville, KY (US); Roger Steven Cannon, Nicholasville, KY (US); Gary Allen Denton, Lexington, KY (US); James Paul Drummond, Georgetown, KY (US); Kelly Ann Killeen, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 14/879,199

(22) Filed: Oct. 9, 2015

(51) Int. Cl.
*H03K 19/003* (2006.01)

(52) U.S. Cl.
CPC .................... *H03K 19/003* (2013.01)

(58) Field of Classification Search
CPC ...................................... H03K 19/003
See application file for complete search history.

(56) References Cited

U.S. PATENT DOCUMENTS

| | | | |
|---|---|---|---|
| 4,218,674 A | 8/1980 | Brosow | |
| 4,734,695 A | 3/1988 | Goldman | |
| 5,451,759 A | 9/1995 | Hoshino | |
| 7,218,589 B2 | 5/2007 | Wisnudel | |
| 7,353,994 B2 | 4/2008 | Farrall | |
| 7,427,020 B2 | 9/2008 | Haraszti | |
| 7,865,722 B2 | 1/2011 | Moran | |
| 8,421,625 B2 | 4/2013 | Cowburn | |
| 8,497,983 B2 | 7/2013 | Cowburn | |
| 8,502,668 B2 | 8/2013 | Cowburn | |
| 8,742,891 B2 | 6/2014 | Greene | |
| 2008/0199667 A1* | 8/2008 | Cho | G02F 1/091 428/212 |
| 2010/0038598 A1 | 2/2010 | Bastiaansen | |
| 2010/0219251 A1 | 9/2010 | Decoux | |

FOREIGN PATENT DOCUMENTS

| | | |
|---|---|---|
| EP | 1 475 242 A1 | 11/2004 |
| WO | 2005/112009 A2 | 11/2005 |
| WO | 2012/020263 A1 | 2/2012 |

OTHER PUBLICATIONS

Roel Maes, Ingrid Verbauwhede, "Physically unclonable functions: A study on the state of the art and future research directions", article, 2010.
Pappu Srinivasa Ravikanth, "Physical One-Way Functions", thesis, 2001.

\* cited by examiner

*Primary Examiner* — G. M. Hyder

(57) ABSTRACT

A physical unclonable function (PUF) having magnetic and non-magnetic particles is disclosed. Measuring both magnetic field and image view makes the PUF difficult to counterfeit. PUF may be incorporated into a user-replaceable supply item for an imaging device. A PUF reader may be incorporated into an imaging device to read the PUF. Other systems are disclosed.

41 Claims, 10 Drawing Sheets

| | 0° | 10° | 20° | 30° | 40° | 50° | 60° | 70° | 80° | 340° | 350° | 360° | 370° | 380° | 390° |
|---|---|---|---|---|---|---|---|---|---|---|---|---|---|---|---|
| 710 | $F_0$ | $F_1$ | $F_2$ | $F_3$ | $F_4$ | $F_5$ | $F_6$ | $F_7$ | $F_8$ | $F_{34}$ | $F_{35}$ | $F_{36}$ | $F_{37}$ | $F_{38}$ | $F_{39}$ |

| | 90° | 100° | 110° | 120° | 130° | 140° | 150° | 160° | 170° | 430° | 440° | 450° | 460° | 470° | 480° |
|---|---|---|---|---|---|---|---|---|---|---|---|---|---|---|---|
| 712 | $I_0$ | $I_1$ | $I_2$ | $I_3$ | $I_4$ | $I_5$ | $I_6$ | $I_7$ | $I_8$ | $I_{34}$ | $I_{35}$ | $I_{36}$ | $I_{37}$ | $I_{38}$ | $I_{39}$ |

PHYSICAL UNCLONABLE FUNCTIONS HAVING MAGNETIC AND NON-MAGNETIC PARTICLES

CROSS REFERENCES TO RELATED APPLICATIONS

The following applications are related and were filed contemporaneously with this application: "METHODS OF MAKING PHYSICAL UNCLONABLE FUNCTIONS HAVING MAGNETIC AND NON-MAGNETIC PARTICLES", "ROTATING MAGNETIC MEASUREMENTS OF PHYSICAL UNCLONABLE FUNCTIONS", "ROTATING IMAGE MEASUREMENTS OF PHYSICAL UNCLONABLE FUNCTIONS", "ROTATING POLARIZATION MEASUREMENTS OF PHYSICAL UNCLONABLE FUNCTIONS", "PHYSICAL UNCLONABLE FUNCTION IMAGED THROUGH TWO FACES".

BACKGROUND

1. Field of the Disclosure

The present disclosure relates generally to anti-counterfeit systems and more particularly to physical unclonable functions.

2. Description of the Related Art

Counterfeit printer supplies, such as toner bottles, are a problem for consumers. Counterfeit supplies may perform poorly and may damage printers. Printer manufacturers use authentication systems to deter counterfeiters. Physical unclonable functions (PUF) are a type of authentication system that implements a physical one-way function. Ideally, a PUF cannot be identically replicated and thus is difficult to counterfeit. Thus, it is advantageous to maximize the difficulty of replicating a PUF to deter counterfeiters. It is also advantageous for the PUF and PUF reader to be low cost.

SUMMARY

The invention, in one form thereof, is directed to a system having a non-opaque substrate having a region having a volume of 100 cubic millimeters; a plurality of magnetic particles dispersed in the region each having a diameter greater than 25 microns; and a plurality of non-magnetic particles dispersed in the region each having a diameter greater than 100 microns. The magnetic particles have an average diameter of between 50 and 500 microns inclusive and the non-magnetic particles have an average diameter of between 200 and 200 microns inclusive.

The invention, in another form thereof, is directed to a system having a non-opaque substrate; a plurality of magnetic particles dispersed in the substrate; and a plurality of non-magnetic particles dispersed in the substrate containing metal. The magnetic particles have an average diameter of between 50 and 500 microns inclusive and the non-magnetic particles have an average diameter of between 200 and 2000 microns inclusive.

The invention, in yet another form thereof, is directed to a system having a non-opaque substrate; a plurality of magnetic particles dispersed in the substrate; and a plurality of non-magnetic particles dispersed in the substrate. The ratio of the number of non-magnetic particles to the number of magnetic particles is between 1/10 and 2/1 inclusive as measured in a region of the substrate having a volume of 100 cubic millimeters.

The invention, in yet another form thereof, is directed to a system having a non-opaque substrate; a plurality of magnetic particles dispersed in the substrate having a first volume; and a plurality of non-magnetic particles dispersed in the substrate having a second volume. Within a region of the substrate having a volume of 100 cubic millimeters, the first volume is between 00005% and 20% of the volume of the region and the second volume is between 0.003% and 33% of the volume of the region.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
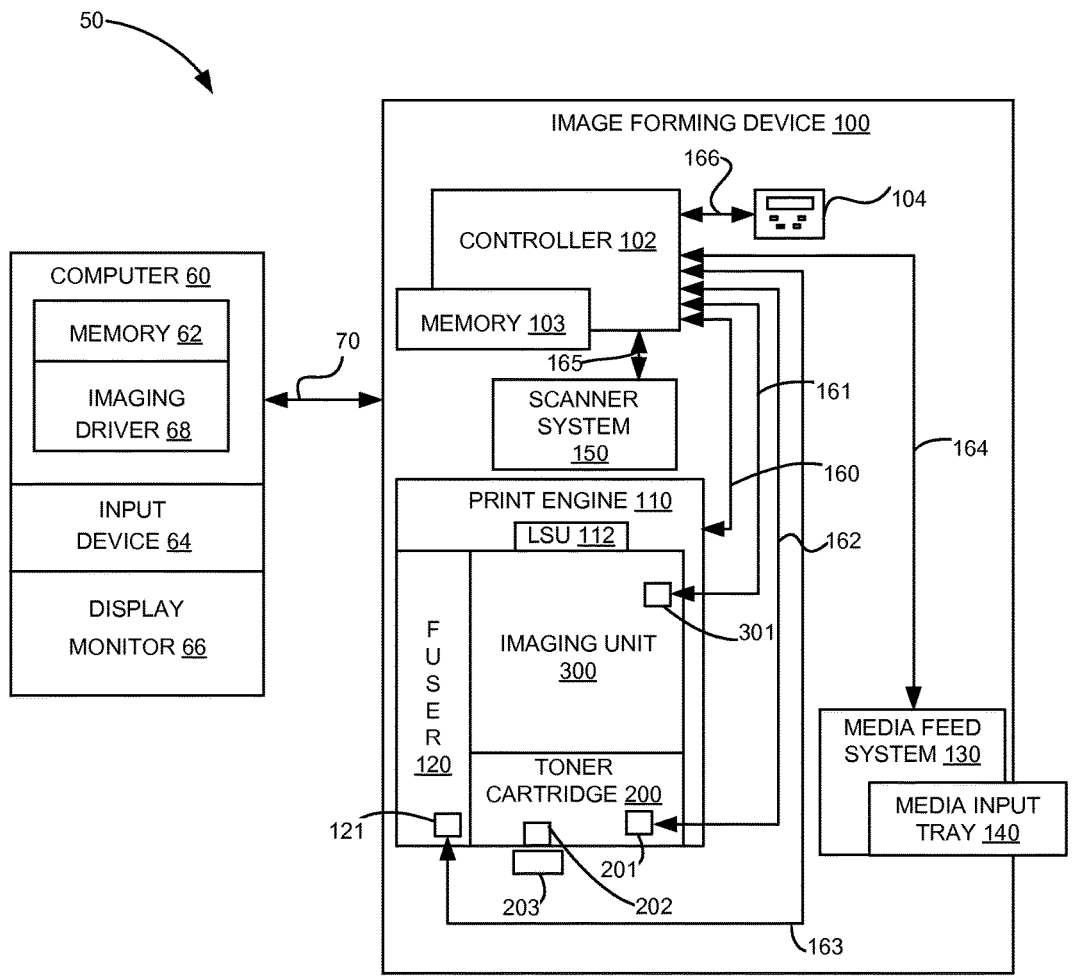
FIG. 1 is a block diagram of an imaging system including an image forming device according to one example embodiment.

Referring to the drawings and particularly to FIG. 1, there is shown a block diagram depiction of an imaging system 50 according to one example embodiment. Imaging system 50 includes an image forming device 100 and a computer 60. Image forming device 100 communicates with computer 60 via a communications link 70. As used herein, the term "communications link" generally refers to any structure that facilitates electronic communication between multiple components and may operate using wired or wireless technology and may include communications over the Internet.

In the example embodiment shown in FIG. 1, image forming device 100 is a multifunction device (sometimes referred to as an all-in-one (AIO) device) that includes a controller 102, a user interface 104, a print engine 110, a laser scan unit (LSU) 112, one or more toner bottles or cartridges 200, one or more imaging units 300, a fuser 120, a media feed system 130 and media input tray 140, and a scanner system 150. Image forming device 100 may communicate with computer 60 via a standard communication protocol, such as, for example, universal serial bus (USB), Ethernet or IEEE 802.xx. Image forming device 100 may be, for example, an electrophotographic printer/copier including an integrated scanner system 150 or a standalone electrophotographic printer.

Controller 102 includes a processor unit and associated memory 103 and may be formed as one or more Application Specific Integrated Circuits (ASICs). Memory 103 may be any volatile or non-volatile memory or combination thereof such as, for example, random access memory (RAM), read only memory (ROM), flash memory and/or non-volatile RAM (NVRAM). Alternatively, memory 103 may be in the form of a separate electronic memory (e.g., RAM, ROM, and/or NVRAM), a hard drive, a CD or DVD drive, or any memory device convenient for use with controller 102. Controller 102 may be, for example, a combined printer and scanner controller.

In the example embodiment illustrated, controller 102 communicates with print engine 110 via a communications link 160. Controller 102 communicates with imaging unit(s) 300 and processing circuitry 301 on each imaging unit 300 via communications link(s) 161. Controller 102 communicates with toner cartridge(s) 200 and non-volatile memory 201 on each toner cartridge 200 via communications link(s) 162. Controller 102 communicates with fuser 120 and processing circuitry 121 thereon via a communications link 163. Controller 102 communicates with media feed system 130 via a communications link 164. Controller 102 communicates with scanner system 150 via a communications link 165. User interface 104 is communicatively coupled to controller 102 via a communications link 166. Processing circuitry 121 and 301 may include a processor and associated memory such as RAM, ROM, and/or non-volatile memory and may provide authentication functions, safety and operational interlocks, operating parameters and usage information related to fuser 120, toner cartridge(s) 200 and imaging unit(s) 300, respectively. Controller 102 processes print and scan data and operates print engine 110 during printing and scanner system 150 during scanning.

Computer 60, which is optional, may be, for example, a personal computer, including memory 62, such as RAM, ROM, and/or NVRAM, an input device 64, such as a keyboard and/or a mouse, and a display monitor 66. Computer 60 also includes a processor, input/output (I/O) interfaces, and may include at least one mass data storage device, such as a hard drive, a CD-ROM and/or a DVD unit (not shown). Computer 60 may also be a device capable of communicating with image forming device 100 other than a personal computer such as, for example, a tablet computer, a smartphone, or other electronic device.

In the example embodiment illustrated, computer 60 includes in its memory a software program including program instructions that function as an imaging driver 68, e.g., printer/scanner driver software, for image forming device 100. Imaging driver 68 is in communication with controller 102 of image forming device 100 via communications link 70. Imaging driver 68 facilitates communication between image forming device 100 and computer 60. One aspect of imaging driver 68 may be, for example, to provide formatted print data to image forming device 100, and more particularly to print engine 110, to print an image. Another aspect of imaging driver 68 may be, for example, to facilitate the collection of scanned data from scanner system 150.

In some circumstances, it may be desirable to operate image forming device 100 in a standalone mode. In the standalone mode, image forming device 100 is capable of functioning without computer 60. Accordingly, all or a portion of imaging driver 68, or a similar driver, may be located in controller 102 of image forming device 100 so as to accommodate printing and/or scanning functionality when operating in the standalone mode.

Several components of the image forming device 100 are user replaceable e.g. toner cartridge 200, fuser 120, and imaging unit 300. It is advantageous to prevent counterfeiting these user replaceable components. A PUF 202 may be attached to the toner cartridge 200 to prevent counterfeiting as described below. A PUF reader 203 may be integrated into the image forming device 100 to verify the authenticity of the PUF 202. Data related to the PUF 202 may reside in non-volatile memory 201.

Figure 2:
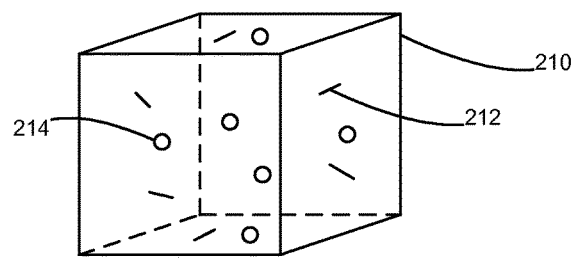
FIG. 2 is an orthogonal view of a substrate containing magnetic and non-magnetic particles.

FIG. 2 shows a region of a substrate 210 containing, for example, transparent plastic. Dispersed in the substrate are a plurality of non-magnetic particles 212 and magnetic particles 214. The particles are distributed randomly such that it is extremely difficult to reproduce the exact distribution and alignment of particles. Thus, the substrate 210 and the particles form a PUF. It is preferable to use both magnetic and non-magnetic particles in a PUF to increase the difficulty in fooling a PUF reader, since both magnetic and non-magnetic information would need to be counterfeited. Further, it is lower cost to make non-magnetic particles vs. magnetic particles, so a mixture will be cheaper than an equivalent number of only magnetic particles. Also, in some practical PUF readers, it is preferred to use larger particles for image data and smaller magnetic particles for magnetic field data due to the resolution of the respective detectors.

Figure 3:
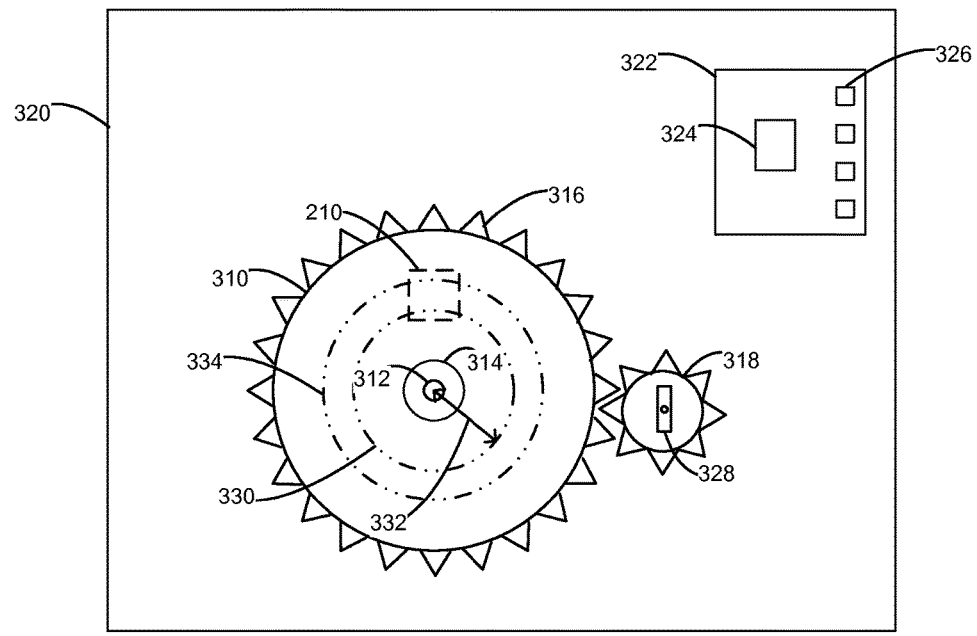
FIG. 3 is a view of a PUF mounted to a body.

FIG. 3 shows an embodiment of a PUF. The substrate is in the form of a gear 310 containing a mixture of magnetic particles 214 and non-magnetic particles 212, for example, the region of the substrate 210 is typical of the entire gear 310. The gear 310 is configured to rotate about a shaft 312 located at the axis of rotation of the gear 310. A raised collar 314 encircles the shaft 312 and is integrated with the gear 310. The gear 310 has a plurality of teeth 316 configured to engage with a coupling 318 such that rotation of the coupling 318 causes the gear 310 to rotate about the shaft 312.

The gear 310 is mounted to a body 320 via the shaft 312. A printed circuit board (PCB) 322 is also mounted to the body and contains a non-volatile memory 324 connected to a plurality of contacts 326. The contacts 326 are used by a PUF reader to provide electrical connection to the non-volatile memory 324. The coupling 318 is also mounted to the body 320 and contains a slot 328 used by the PUF reader to couple to the coupling 318. Of course, other interface geometries may be used instead of a slot 328.

The non-volatile memory 324 contains field data corresponding to the magnetic field generated by the magnetic particles 214 as measured along a first circular path 330 centered on the axis of rotation of the gear 310. The first circular path 330 has a radius 332. The non-volatile memory 324 also contains image data of the magnetic particles 214 and non-magnetic particles 212 as viewed from the first circular path 330.

Note that paths that approximate a circular path may be equivalent to a circular path if the resulting measurements are equivalent to measurements taken along a circular path. For example, wobble in the rotation of the gear 310 may cause deviation from a pure circular path that will generate data that is accepted by a PUF reader as authentic.

Figure 4:
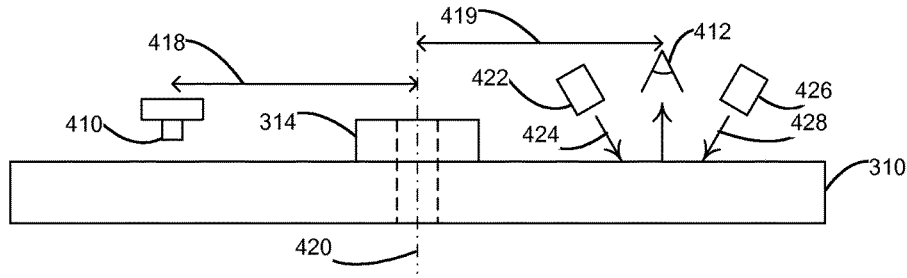
FIG. 4 is a side view of a PUF and PUF readers.

FIG. 4 shows a side view of the gear 310. The teeth 316 are omitted in this view for clarity. FIG. 4 also shows a magnetic field sensor 410, an image sensor 412, a first illumination source 422, and a second illumination source 426, all located in the PUF reader. The magnetic field sensor 410 is located at a distance 418 from the axis 420 of rotation of the gear 310. This distance 418 is the same as the radius 332 of the first circular path 330. The image sensor 412 is located at a distance 419 from the axis 420 and is also the same as the radius 332 of the first circular path 330.

The field data in the non-volatile memory 324 was measured, for example, by the magnetic field sensor 410 and then written to the non-volatile memory 324. The field data may be computationally adjusted for more efficient computation and comparison before written to the non-volatile memory 324. For example, the field data may be clipped such that measurements below a clip threshold are set to a clip value e.g. set to zero. The magnetic field sensor may, for example, measure the magnetic field in one, two, or more orthogonal directions. Measurements in multiple directions are harder to counterfeit than measurements taken in a single direction. Measurements in a first direction may be used to determine when to clip measurements in a second direction e.g. if, at a given position along a path, the measured magnetic field in a first direction is less than a clip value the field data written to the non-volatile memory 324 corresponding to that position will be set to a clip value for both the first direction and for the second orthogonal direction. This may provide more uniform clipping and may make the PUF reader more repeatable.

The image data in the non-volatile memory 324 was measured, for example, by the image sensor 412 and then written to the non-volatile memory 324. The image data may be computationally adjusted before written to the non-volatile memory 324. The image sensor 412 may be, for example, a point sensor, a linear array of point sensors, a two dimensional array of point sensors, etc. The image data may be generated by illuminating the particles with a first illumination source 422 with light traveling along a first illumination line 424 and then illuminating the particles with a second illumination source 426 using a second illumination line 428. The first illumination line 424 is not the same as the second illumination line 428 such that differences in the rotation of individual particles will result in different image data generated by each illumination source. Thus, a counterfeit would need to reproduce the rotation of each particle. Preferably, some of the particles are flakes having an average thickness that is less than their average diameter to increase the contrast between image data generated by the two illumination sources. As used herein, average refers to number average. For example, average diameter is obtained by summing up the diameters of each particle in a set of particles and then dividing by the number of particles. Some particles may be excluded from a set such as, for example, particles with diameters less than 25 microns.

The field data may be measured while rotating the gear 310 next to a stationary magnetic field sensor 410, by moving the magnetic field sensor 410 next to a stationary gear 310, etc. Similarly, the image data may be measured while rotating the gear 310 next to a stationary image sensor 412, by moving the image sensor 412 next to a stationary gear 310, etc. The field data and the image data may be measured at the same time, measured sequentially, etc. The non-volatile memory 324 may contain field data, image data, or both field data and image data.

The non-volatile memory 324 may contain field data, image data or both field data and image data from more than one path, such as, for example, a second circular path 334 that encloses the first circular path 330. Multiple paths may be stored to allow for variability in the position of sensors in a PUF reader.

The non-volatile memory 324 may contain polarization data related to the angle of polarization of light passed through the gear 310, in addition to or instead of field data and image data. The polarization may be caused by stress-induced birefringence in the gear material, which may contain, for example, polystyrene, polycarbonate, etc. The birefringence modulates the angle of polarization of light passed through regions of the gear 310. The polarization data may correspond to measurements made along a path that encloses axis 420. Birefringence may be caused by the presence of magnetic particles 214, non-magnetic particles 212, circular or non-circular holes in the gear 310 that create stress due to non-uniform cooling during the manufacturing process, etc.

Figure 16:
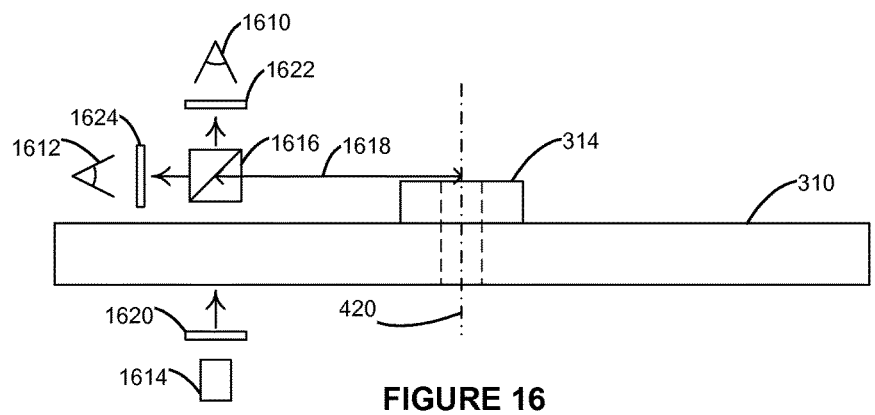
FIG. 16 is a side view of a PUF and a PUF reader.

FIG. 16 shows a side view of the gear 310 and a PUF reader that measures light polarization. FIG. 16 also shows a first light sensor 1610, a second light sensor 1612, an illumination source 1614, and a beam splitter 1616, all located in the PUF reader. The beam splitter 1616 is located at a distance 1618 from the axis 420 of rotation of the gear 310. This distance 1618 is the same as the radius 332 of the first circular path 330. Light from the illumination source 1614 passes through a first linear polarizing filter 1620, through the gear 310, and into the beam splitter 1616. The light then simultaneously passes through a second linear polarizing filter 1622 to the first light sensor 1610 and though a third linear polarizing filter 1624 to the second light sensor 1612. The second linear polarizing filter 1622 is rotated relative to the third linear polarizing filter 1622, preferably ninety degrees. Thus, the first light sensor 1610 will measure a different polarity of light than the second light sensor 1612. Birefringence modulates the angle of polarization of light passed through regions of the gear 310 as described above. It is preferable to measure transmitted light at two polarization angles to avoid a counterfeiter fooling the PUF reader with a varyingly opaque substrate, since both polarization angle sensors would measure the same opacity. Note that the first linear polarizing filter 1620 is optional depending on the properties of the illumination source 1614.

Figure 5:
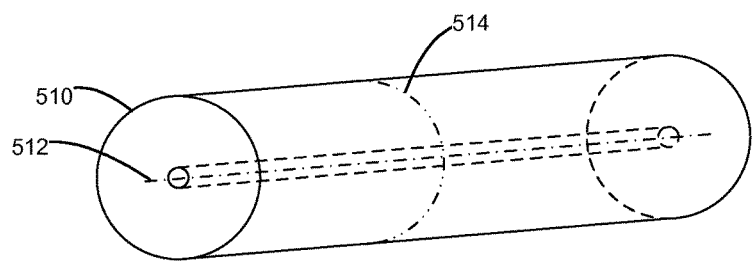
FIG. 5 is a view of a cylindrical PUF.

FIG. 5 shows an alternative substrate configuration. The substrate is a cylinder having an axis of rotation 512. Field data and image data may be measured along a circular path 514 located around the side of the cylinder 510 and centered on the axis 512.

Figures 6, 7:
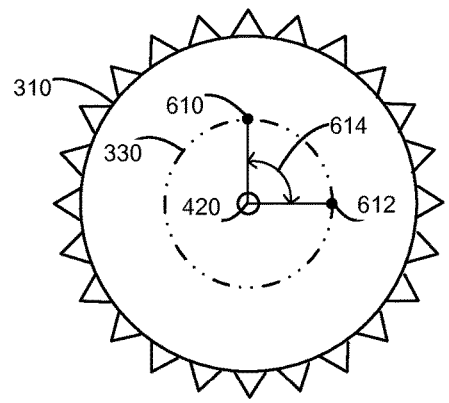
FIG. 6 is a view of a PUF and locations along a circular path.
FIG. 7 is a series of data elements corresponding to a sequential series of locations along a circular path.

FIG. 6 shows a first location 610 and a second location 612 on the first circular path 330. In this example, the magnetic field sensor 410 is positioned at the first location 610 and the image sensor 412 is positioned at the second location 612. Alternatively, the magnetic field sensor 410 may be positioned at the first location 610 and the beam splitter 1616 may be positioned at the second location 612. Preferably, the sensors are not positioned at the same location to reduce system complexity. The central angle 614 between the first location 610 and the second location 612 is greater than 45 degrees to provide sufficient space for the sensors.

FIG. 7 shows a series of data elements corresponding to a sequential series of locations along the first circular path 330. The field data elements are stored sequentially in the non-volatile memory device 324 as are the image data elements. In this example, there are forty field data elements F0-F39 spaced 10 degrees apart. For simplicity, FIG. 7 shows a subset of these data elements. The central angle is 90 degrees, and 0 degrees is assigned to the first location 610. It is preferable to take measurements from both sensors at the same time to improve system throughput. Thus, since the first field data element 710 is at zero degrees, the first image data element 712 is at 90 degrees. There are forty image data elements I0-I39 that are also spaced 10 degrees apart. Of course, more or fewer data elements may be used and the spacing need not be uniform. In operation, the PUF reader will simultaneously measure magnetic field data and image data and thus the physical offset between the first location 610 and second location 612 is encoded in the data.

It is preferable to have at least 360 degrees of field data and image data so that the PUF reader may start reading at any position along a path. With this system, an absolute position indicator is not required e.g. an one-per-revolution sensor. Note that the field data in FIG. 7 corresponds to more than 360 degrees around the first circular path 330. The overlapping data removes the discontinuity between the first reading at, for example, 0 degrees and the last reading at 350 degrees. The discontinuity may be caused by, for example, wobble in the gear. The PUF reader may average the reading at 0 degrees and the reading at 360 degrees to reduce this error.

Measuring field data and image data around a closed path is superior to measuring along a linear path. Multiple passes may be easily measured to tune sensor dynamic range, average readings to reduce noise, etc. Also, it is easier, and thus cheaper, to precisely control rotational motion than linear motion because fewer mechanical tolerances contribute to position inaccuracy.

Figure 8:
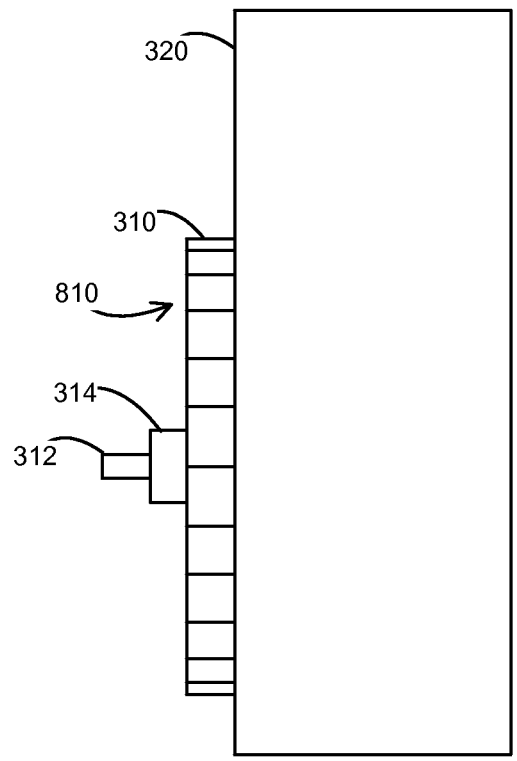
FIG. 8 is a side view of a PUF mounted to a body.
Figure 9:
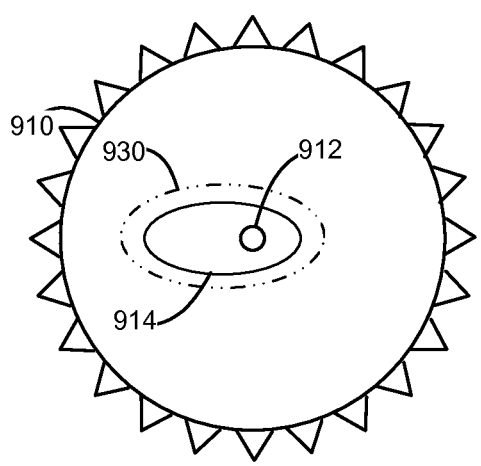
FIG. 9 is a view of a PUF and a non-circular path.

FIG. 8 shows a side view of the gear 310 and the body 320. The shaft 312 protrudes beyond the gear 310 on the side 810 opposite the body. The PUF reader may set the position of the sensors by using the side of the shaft as a datum. This will improve the positioning tolerance of the system. Alternatively, the PUF reader may use the side of the raised collar 314 as a datum. As shown in FIG. 9, if the raised collar 914 is non-circular, the resulting path 930 will also be non-circular and will follow the outer surface of the raised collar 914 at a fixed offset. A non-circular path may be more difficult to counterfeit than a simpler circular path. Alternatively, the raised collar may be circular with a center that is offset from the shaft 912, resulting in a circular path that is not centered on the axis of rotation of the gear 910.

Figure 10:
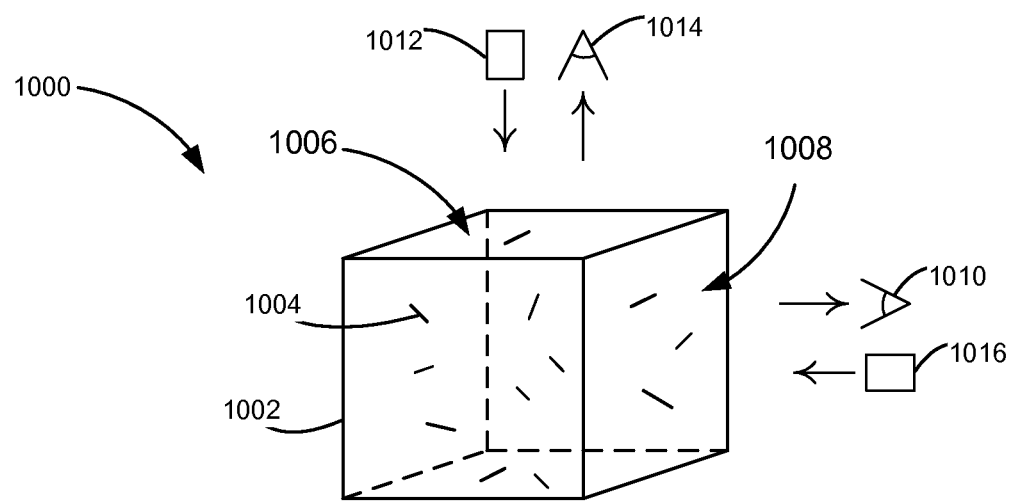
FIG. 10 and FIG. 11 are orthogonal views of a PUF and sensors.

FIG. 10 shows a cubic region 1000 of a non-opaque substrate 1002 containing a plurality of particles 1004. The cubic region 1000 has a first face 1006 that is contiguous with a second face 1008. The first face 1006 and the second face 1008 may be surfaces of the substrate 1002. Alternatively, the first face 1006 and the second face 1008 may be faces of a cubic region within a larger substrate. The particles may be reflective, opaque, magnetic, and any combination thereof. Preferably, each particle has a diameter greater than 100 microns and the average diameter of the particles is between 200 and 2000 microns inclusive so the particles are large enough to be viewable by low-cost image sensors while being small enough to provide sufficient complexity to defeat counterfeiters. Note that the diameter of a non-spherical particle is the diameter of the smallest sphere that encloses the particle. Ideally, the substrate is composed of a transparent material such as transparent plastic. A reflective particle has a specular reflection that is at least twice as large as its diffuse reflection.

The cubic region 1000 may be used as a PUF. A PUF reader contains a first image sensor positioned to view the particles through the second face 1008 while a first illumination source 1012 illuminates the particles through the first face 1006 to measure first image data. The first illumination source 1012 is positioned relative to the first face 1006 to minimize any surface reflections bouncing off the first face 1006 and striking the first image sensor 1010. In this example, the first illumination source 1012 is pointed orthogonally at the first face 1006. A second image sensor 1014 is positioned to view the particles through the first face 1006 while a second illumination source 1016 illuminates the particles through the second face 1008 to measure second image data. The PUF reader compares the first image data and the second image data to a master database to verify the authenticity of the PUF. The master database may be stored on a computer server, on a non-volatile memory associated with the PUF, etc. Preferably, the first illumination source 1012 and the second illumination source 1016 are not energized simultaneously to avoid surface reflections corrupting the image data.

Figure 11:
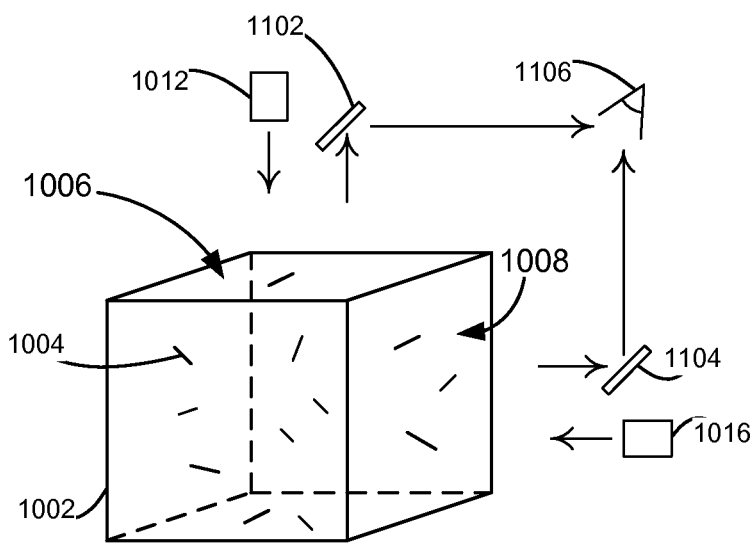

FIG. 11 shows an alternative PUF reader configuration. A first mirror 1102 and a second mirror 1104 simultaneously reflect images of the particles from the first face 1006 and the second face 1008 respectively to an image sensor 1106. In operation, the first illumination source 1012 illuminates the particles through the first face 1006 and the image sensor 1106 measures first image data of the particles as viewed simultaneously through the first face 1006 and the second face 1008. The second illumination source 1016 illuminates the particles through the second face 1008 and the image sensor 1106 measures second image data of the particles as viewed simultaneously through the first face 1006 and the second face 1008. This configuration requires a single image sensor and thus may be lower cost than a configuration that requires multiple image sensors. In this example, the first illumination source 1012 and the second illumination source 1016 are not energized simultaneously so that the first image data is different than the second image data. However, third image data may be generated by energizing both the first illumination source 1012 and the second illumination source 1016 simultaneously.

Figure 12:
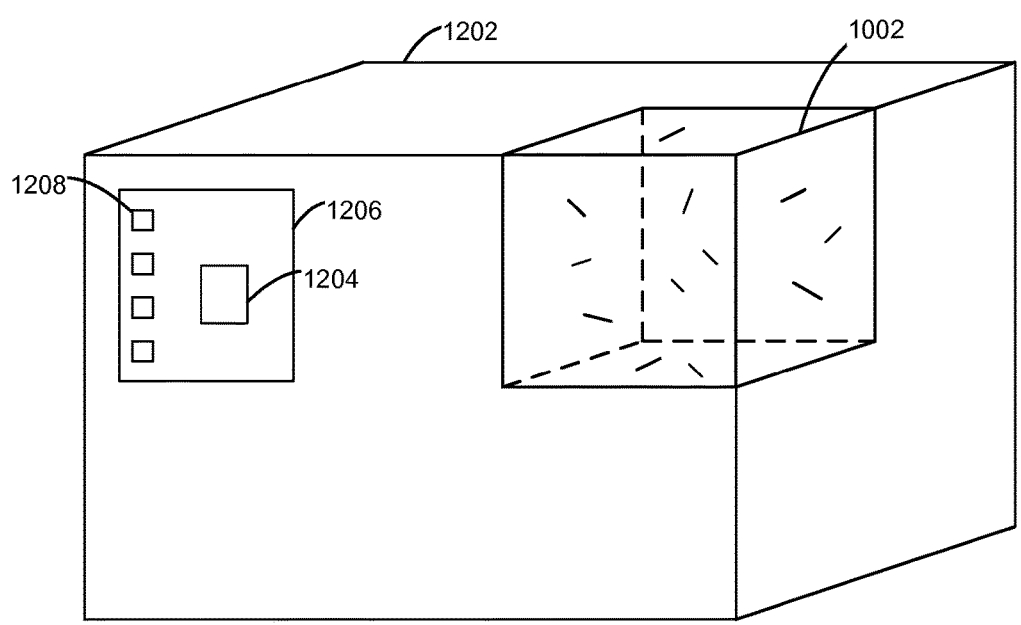
FIG. 12 is an orthogonal view of a PUF mounted to a body.

FIG. 12 shows the substrate 1002 mounted to a body 1202. Also mounted to the body 1202 is a non-volatile memory 1204 mounted on a PCB 1206 having electrical contacts 1208. The non-volatile memory 1204 contains one or more of the image data described above with respect to FIG. 10 and FIG. 11. In operation, a PUF tester will measure image data of the particles in the substrate 1002 to compare with the image data in the non-volatile memory 1204. If the image data matches, the PUF is genuine otherwise the PUF is a counterfeit. Preferably, the image data in the non-volatile memory 1204 is measured and stored after the substrate 1002 is mounted to the body 1202 so any image distortion caused by reflections off the body will occur in both the non-volatile memory image data and the image data measured by the PUF tester.

Figure 13:
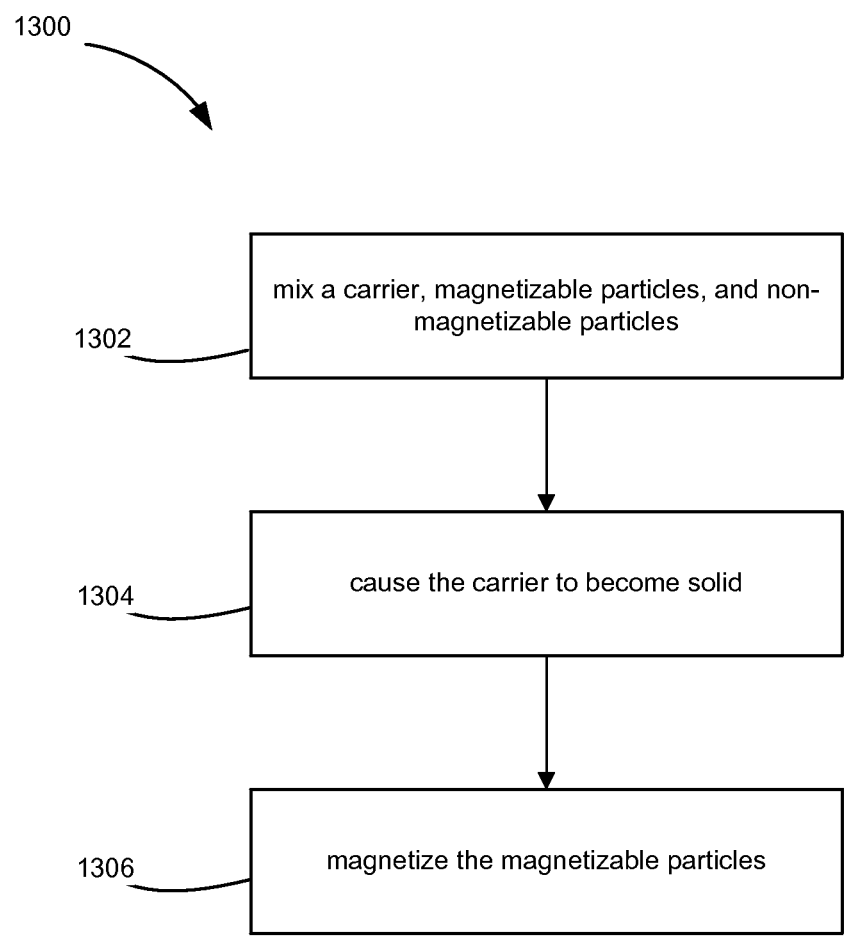
FIG. 13, FIG. 14, and FIG. 15 are flowcharts of methods of making security devices.

FIG. 13 shows an example embodiment of a method of making a security device according to one embodiment. Method 1300 makes a PUF that is suitable for both magnetic field measurements and image measurements and is thus difficult to counterfeit.

At block 1302, a carrier having a volume of X, magnetizable particles having a volume Y, and non-magnetizable particles having a volume Z are mixed. Preferably, $0.25*X > Y > 0.000005*X$ and $0.5*X > Z > 0.00003*X$ to provide a sufficiently strong magnetic field for accurate measurement and provide a sufficiently complex image to prevent counterfeiting. Preferably, 50,000*Y>Z>0.002*Y to provide for both magnetic measurements and image measurements. For example, magnetic particles having a combined volume of 0.01% of the mixture and non-magnetic particles having a combined volume of 0.02% of the mixture are effective in this application. Preferably, the ratio of the number of non-magnetic particles to the number of magnetic particles is between 1/10 and 2/1 inclusive. For example, magnetic particles with an average diameter of 200 microns and non-magnetic particles with an average diameter of 500 microns are effective in this application.

The magnetizable particles may be flakes having an average thickness that is less than an average diameter of the flakes. Images of flakes vary with rotation of the flakes and provide additional complexity to the PUF. Preferably, the magnetizable particles have an average diameter of between 50 and 500 microns inclusive, and the non-magnetizable particles have an average diameter of between 200 and 2000 microns inclusive, to provide a sufficiently strong magnetic field for accurate measurement and provide a sufficiently complex image to prevent counterfeiting. Preferably, the non-magnetizable particles are much larger than the magnetizable particles e.g. the magnetizable particles have a first average diameter, the non-magnetizable particles have a second average diameter, and the second average diameter is at least twice as large as the first average diameter. This helps to reduce cost since smaller magnetic particles require less magnetic material and the larger non-magnetic particles are easier for an image sensor to measure. Preferably, the non-magnetizable particles are reflective to generate high contrast images and may include a low-cost metal such as aluminum. The magnetizable particles may contain neodymium and iron and boron. Alternatively, the magnetizable particles may contain samarium and cobalt. Preferably, the magnetic particles each have a diameter greater than 25 microns so they generate a sufficiently strong magnetic field to be detected with a low-cost detector.

At block 1304, the method causes the carrier to become solid. The carrier may be, for example, a liquid that is caused to become solid by adding a chemical, subjecting to ultraviolet light, increasing its temperature, etc. Alternatively, the carrier may be, for example, grains that are sintered. Causing the carrier to become solid locks the distribution and orientation of the particles.

At block 1306, the magnetizable particles are magnetized by, for example, subjecting the particles to a strong magnetic field. It is preferable to magnetize the particles after the carrier is caused to become solid to prevent the particles from clumping together due to magnetic attraction. Alternatively, if suitable substrate materials are used that allow unformed aggregate pellets of the substrate material, magnetic particles and optical particles to be magnetized and later formed, the magnetic field orientation of the magnetic particles may be more random, and therefore more difficult to clone. Further, the application of a magnetizing field with patterned or randomized orientation may be applied to a formed substrate in order to cause greater diversity of magnetic field orientation.

Figure 14:
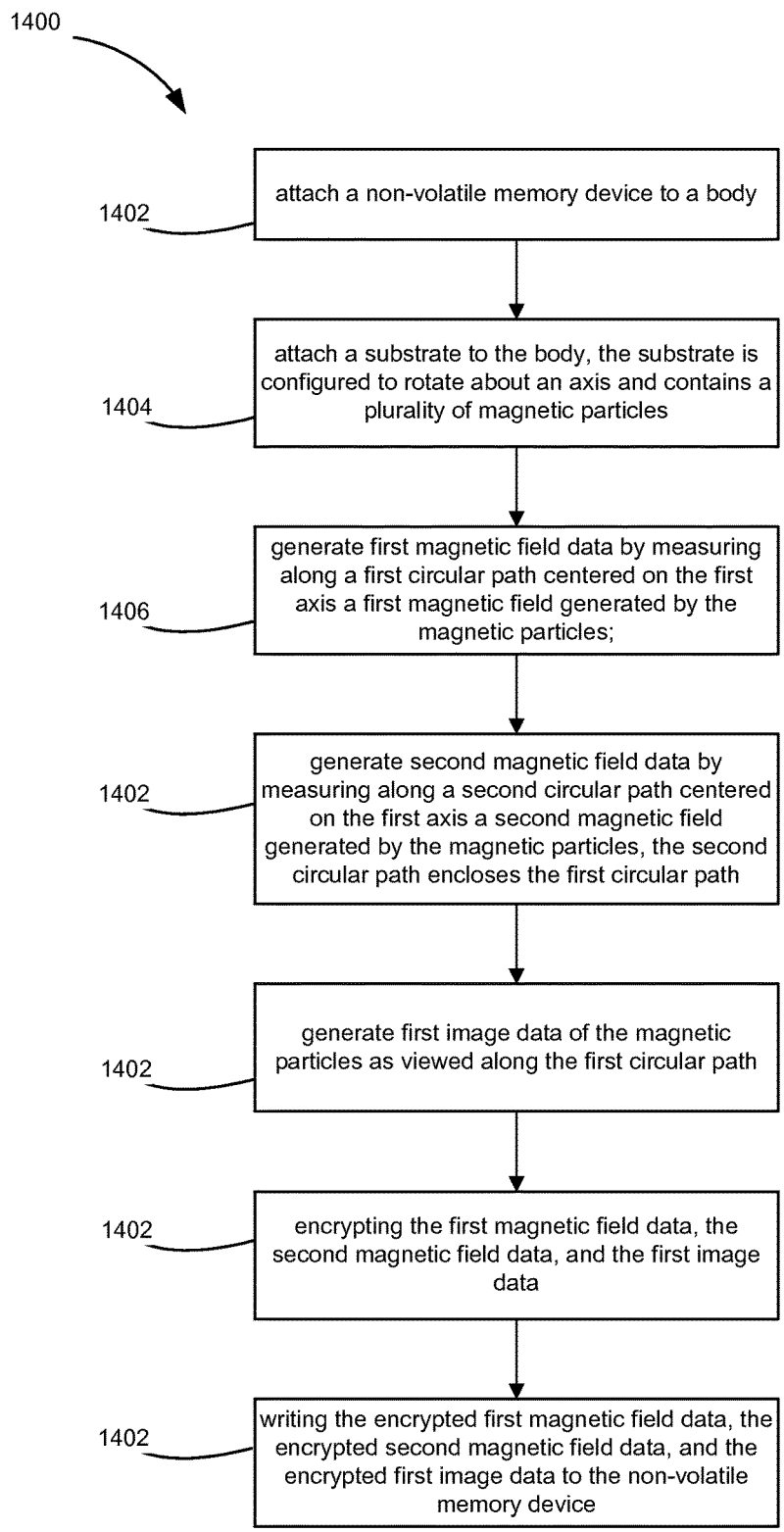

FIG. 14 shows an example embodiment of a method of making a security device according to one embodiment. Method 1400 makes an authentication device having a PUF and is thus difficult to counterfeit.

At block 1402, a non-volatile memory device is attached to a body. At block 1404, a substrate is attached to the body, the substrate is configured to rotate about an axis and contains a plurality of magnetic particles. At block 1406, first magnetic field data is generated by measuring along a first circular path centered on the first axis a first magnetic field generated by the magnetic particles. At block 1408, second magnetic field data is generated by measuring along a second circular path centered on the first axis a second magnetic field generated by the magnetic particles, the second circular path encloses the first circular path. At block 1410, first image data of the magnetic particles is generated as viewed along the first circular path.

At block 1412, the first magnetic field data, the second magnetic field data, and the first image data are encrypted. At block 1414, the encrypted first magnetic field data, the encrypted second magnetic field data, and the encrypted first image data are written to the non-volatile memory device. Encryption prevents a counterfeit authentication device from fooling a PUF reader by presenting data measured from counterfeit particles stored in a non-volatile memory device. A counterfeit authentication device must correctly encrypt the data or the PUF reader will not be fooled. Encrypting data may include obscuring all the data, obscuring only some of the data, cryptographically signing the data, etc.

Blocks need not be performed in the example order given. For example, blocks 1406, 1408, and 1410 may occur before or after block 1402.

Figure 15:
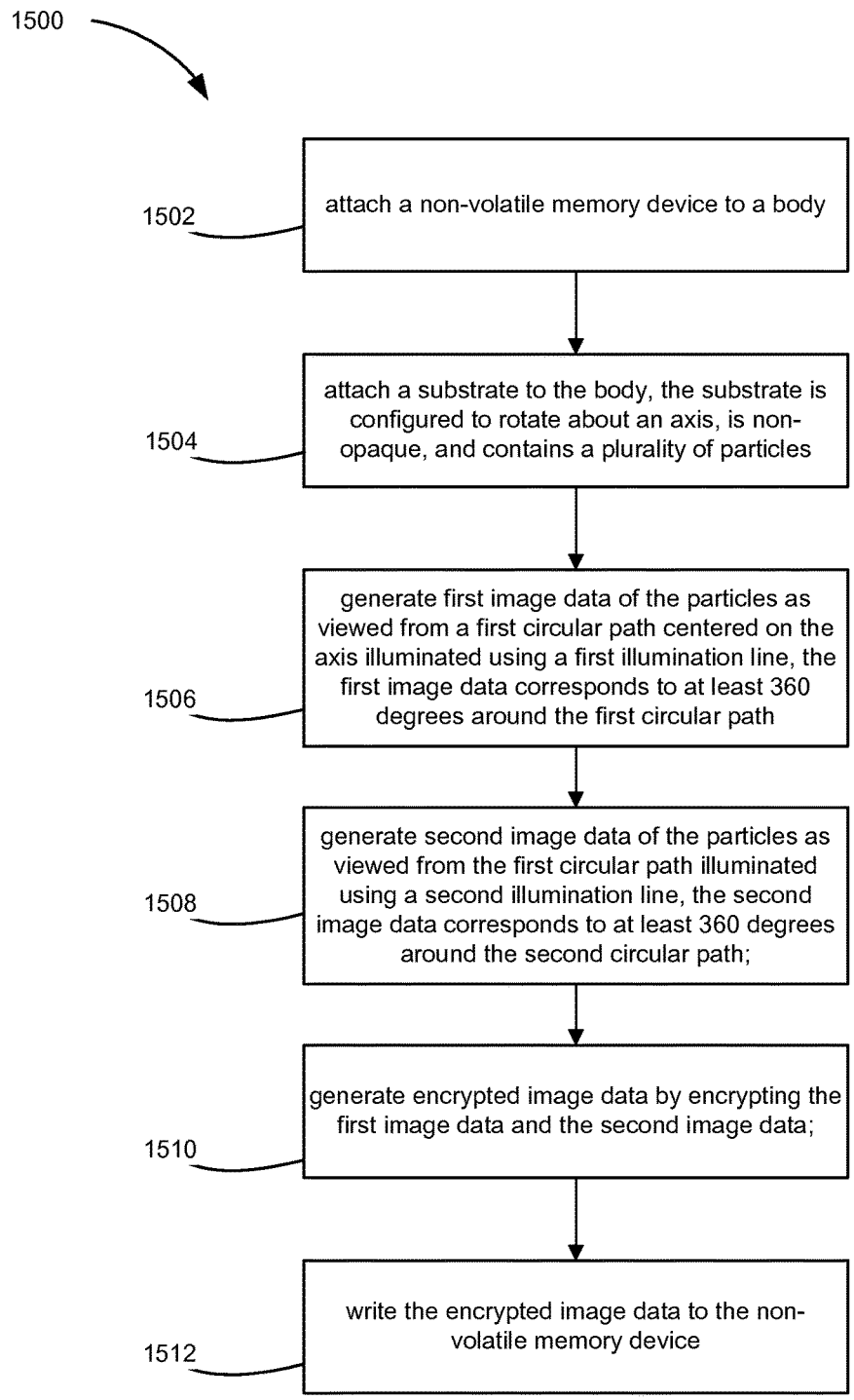

FIG. 15 shows an example embodiment of a method of making a security device according to one embodiment. Method 1500 makes an authentication device having a PUF and is thus difficult to counterfeit.

At block 1502, a non-volatile memory device is attached to a body. At block 1504, a substrate is attached to the body, the substrate is configured to rotate about an axis, is non-opaque, and contains a plurality of particles. At block 1506, first image data of the particles is generated as viewed from a first circular path centered on the axis illuminated using a first illumination line, the first image data corresponds to at least 360 degrees around the first circular path. At block 1508, second image data of the particles is generated as viewed from the first circular path illuminated using a second illumination line, the second image data corresponds to at least 360 degrees around the second circular path.

At block 1510, encrypted image data is generated by encrypting the first image data and the second image data. At block 1512, encrypted image data is written to the non-volatile memory device. As discussed above, encrypted data makes the authentication device more difficult to counterfeit.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

What is claimed is:

1. A system comprising:
   a non-opaque substrate having a region having a volume of 100 cubic millimeters;
   a plurality of magnetic particles dispersed in the region each having a diameter greater than 25 microns; and
   a plurality of non-magnetic particles dispersed in the region each having a diameter greater than 100 microns, wherein the magnetic particles have an average diameter of between 50 and 500 microns inclusive and the non-magnetic particles have an average diameter of between 200 and 2000 microns inclusive.

2. The system of claim 1, wherein the magnetic particles are flakes each having an average thickness that is less than their diameter.

3. The system of claim 1, wherein the non-magnetic particles are flakes each having an average thickness that is less than their diameter.

4. The system of claim 1, wherein the average diameter of the non-magnetic particles is at least twice as large as the average diameter of the magnetic particles.

5. The system of claim 1, wherein the non-magnetic particles are reflective.

6. The system of claim 1, wherein the magnetic particles contain neodymium and iron and boron.

7. The system of claim 1, wherein the magnetic particles contain samarium and cobalt.

8. The system of claim 1, wherein the substrate is configured to rotate about an axis.

9. The system of claim 1, wherein the substrate is a gear.

10. The system of claim 1, further comprising a body and a non-volatile memory, the substrate and the non-volatile memory are mounted to the body, the non-volatile memory contains field data corresponding to a magnetic field generated by the magnetic particles and image data corresponding to a view of the magnetic particles and the non-magnetic particles.

11. A system comprising:
a non-opaque substrate;
a plurality of magnetic particles dispersed in the substrate; and
a plurality of non-magnetic particles dispersed in the substrate containing metal,
wherein the magnetic particles have an average diameter of between 50 and 500 microns inclusive and the non-magnetic particles have an average diameter of between 200 and 2000 microns inclusive.

12. The system of claim 11, wherein the magnetic particles are flakes each having an average thickness that is less than their diameter.

13. The system of claim 11, wherein the non-magnetic particles are flakes each having an average thickness that is less than their diameter.

14. The system of claim 11, wherein the average diameter of the non-magnetic particles is at least twice as large as the average diameter of the magnetic particles.

15. The system of claim 11, wherein the magnetic particles contain neodymium and iron and boron.

16. The system of claim 11, wherein the magnetic particles contain samarium and cobalt.

17. The system of claim 11, wherein the substrate is configured to rotate about an axis.

18. The system of claim 11, wherein the substrate is a gear.

19. The system of claim 11, further comprising a body and a non-volatile memory, the substrate and the non-volatile memory are mounted to the body, the non-volatile memory contains field data corresponding to a magnetic field generated by the magnetic particles and image data corresponding to a view of the magnetic particles and the non-magnetic particles.

20. A system comprising:
a non-opaque substrate;
a plurality of magnetic particles dispersed in the substrate; and
a plurality of non-magnetic particles dispersed in the substrate,
wherein the ratio of the number of non-magnetic particles to the number of magnetic particles is between 1/10 and 2/1 inclusive as measured in a region of the substrate having a volume of 100 cubic millimeters.

21. The system of claim 20, wherein the magnetic particles in the region are flakes having an average thickness that is less than an average diameter of the flakes.

22. The system of claim 20, wherein the magnetic particles in the region have an average diameter of between 50 and 500 microns inclusive.

23. The system of claim 20, wherein the non-magnetic particles in the region have an average diameter of between 200 and 2000 microns inclusive.

24. The system of claim 20, wherein the magnetic particles in the region have a first average diameter, the non-magnetic particles in the region have a second average diameter, and the second average diameter is at least twice as large as the first average diameter.

25. The system of claim 20, wherein the non-magnetic particles are reflective.

26. The system of claim 20, wherein the magnetic particles contain neodymium and iron and boron.

27. The system of claim 20, wherein the magnetic particles contain samarium and cobalt.

28. The system of claim 20, wherein the substrate is configured to rotate about an axis.

29. The system of claim 20, wherein the substrate is a gear.

30. The system of claim 20, further comprising a body and a non-volatile memory, the substrate and the non-volatile memory are mounted to the body, the non-volatile memory contains field data corresponding to the magnetic field generated by the magnetic particles and image data corresponding to a view of the magnetic particles and the non-magnetic particles.

31. A system comprising:
a non-opaque substrate;
a plurality of magnetic particles dispersed in the substrate having a first volume; and
a plurality of non-magnetic particles dispersed in the substrate having a second volume,
wherein, within a region of the substrate having a volume of 100 cubic millimeters, the first volume is between 0.0005% and 20% of the volume of the region and the second volume is between 0.003% and 33% of the volume of the region.

32. The system of claim 31, wherein the magnetic particles in the region are flakes having an average thickness that is less than an average diameter of the flakes.

33. The system of claim 31, wherein the magnetic particles in the region have an average diameter of between 50 and 500 microns inclusive.

34. The system of claim 31, wherein the non-magnetic particles in the region have an average diameter of between 200 and 2000 microns inclusive.

35. The system of claim 31, wherein the magnetic particles in the region have a first average diameter, the non-magnetic particles in the region have a second average diameter, and the second average diameter is at least twice as large as the first average diameter.

36. The system of claim 31, wherein the non-magnetic particles are reflective.

37. The system of claim 31, wherein the magnetic particles contain neodymium and iron and boron.

38. The system of claim 31, wherein the magnetic particles contain samarium and cobalt.

39. The system of claim 31, wherein the substrate is configured to rotate about an axis.

40. The system of claim 31, wherein the substrate is a gear.

41. The system of claim 31, further comprising a body and a non-volatile memory, the substrate and the non-volatile memory are mounted to the body, the non-volatile memory contains field data corresponding to the magnetic field generated by the magnetic particles and image data corresponding to a view of the magnetic particles and the non-magnetic particles.

* * * * *